United States Patent [19]
Foster et al.

[11] Patent Number: 5,951,081
[45] Date of Patent: Sep. 14, 1999

[54] LATERAL SUPPORT FOR A DRIVE GEAR AND WHEEL ON A LOCOMOTIVE AXLE

[75] Inventors: Robert Burke Foster, Erie, Pa.; Michael Philip Hagle, Mason, Ohio

[73] Assignee: General Electric Company, Erie, Pa.

[21] Appl. No.: 08/959,259

[22] Filed: Oct. 29, 1997

[51] Int. Cl.$^6$ ................................................. B60B 35/00
[52] U.S. Cl. ........................ 295/36.1; 295/4; 295/5; 295/36.1; 295/43; 411/512
[58] Field of Search ................... 295/4, 5, 36.1, 295/43; 411/517, 518, 519, 516, 521, 352, 353, 512; 403/154, 155, 150

[56] References Cited

U.S. PATENT DOCUMENTS

| | | | |
|---|---|---|---|
| 593,419 | 11/1897 | Lachenmaier | 295/4 |
| 848,442 | 3/1907 | Carr et al. | 295/4 |
| 1,230,921 | 6/1917 | Paul | 411/353 |
| 1,595,054 | 8/1926 | Ballou, Jr. | 411/353 |
| 3,032,807 | 5/1962 | Lanius, Jr. | 411/517 |
| 3,589,205 | 6/1971 | Radovik | 295/4 |
| 3,825,272 | 7/1974 | Townsend . | |
| 3,957,274 | 5/1976 | Lang . | |
| 3,987,697 | 10/1976 | Wurzel | 411/353 |
| 4,158,407 | 6/1979 | Rest | 295/36.1 |
| 4,637,646 | 1/1987 | Ortwein et al. . | |
| 4,767,108 | 8/1988 | Tanaka et al. . | |
| 4,854,745 | 8/1989 | Kamimura et al. . | |
| 5,040,905 | 8/1991 | Boyd . | |
| 5,062,654 | 11/1991 | Kakimoto et al. . | |
| 5,681,060 | 10/1997 | Berg et al. | 411/353 |

*Primary Examiner*—D. Glenn Dayoan
*Assistant Examiner*—Long Bao Nguyen
*Attorney, Agent, or Firm*—Ann M. Agosti; Jill M. Breedlove

[57] ABSTRACT

A method and apparatus for aiding in positioning during assembly of a locomotive wheel with respect to a drive gear mounted adjacent the wheel during assembly and for maintaining the position of the drive gear during locomotive operation. The apparatus includes a lateral stop including a spacer formed of a semi-elastomeric material having a low coefficient of friction and specially adapted to fit into a stress relief groove of an axle between a hub of the drive gear and a hub of the wheel. The spacer is so designed as to be installable on the locomotive axle after installation of the drive gear, to be self-centering on the axle and to inhibit rotation of the spacer with respect to the axle such that the axle will not be marked circumferentially by spacer rotation.

5 Claims, 1 Drawing Sheet

LATERAL SUPPORT FOR A DRIVE GEAR AND WHEEL ON A LOCOMOTIVE AXLE

The present invention relates to wheel and axle sets for locomotives and, more particularly, to a method and apparatus for maintaining spacing between an axle mounted driving gear and a wheel on the axle.

BACKGROUND OF THE INVENTION

Locomotive propulsion systems commonly use high horsepower electric traction motors connected through suitable gearing to drive wheel/axle sets. Each wheel axle set includes an axle, a pair of wheels and a drive gear mounted to the axle. Both the wheels and drive gear are press fit on the axle. The drive gear is located adjacent to and inboard of one of the wheels on one end of the axle. The area of the axle at which the drive gear and adjacent wheel is mounted is a highly stressed area and for that reason there is generally a circumferential stress relief groove formed around the axle between the drive gear and wheel. Both the gear and wheel include an enlarged hub portion in press fit relation to the axle. During operation of the locomotive, the torque transmitted to the wheels through the drive gear pressed on the axle may cause the gear hub to slip slightly from its normal spaced position with respect to the hub of the wheel. One of the functions of the gear hub is to provide an axial position limit for a gear side cone of a tapered roller bearing which supports part of the weight of the traction motor on the axle. Small axial movement of the gear in a direction which would reduce the space between the gear hub and wheel hub results in an increase in the clearance in the traction motor to axle support bearings and a reduction in their anticipated fatigue life. Accumulated small axial movements of the gear hub may result in bearing clearances sufficiently large that undesirable contact between rotating and static structural members of the axle support assembly may occur. Accordingly, it is desirable to provide some means for maintaining the spacing of the gear hub from the wheel hub.

During the process of assembling the wheel/axle set, one wheel may be pressed onto one end of the axle followed by pressing the drive gear onto an opposite end of the axle. Finally, the second wheel is pressed onto the opposite end of the axle adjacent the drive gear. Historically, the position of the second wheel is determined by a measuring rod placed between the one and the second wheel. Because this measurement extends over feet, there is often some small error in measurement which varies the spacing between the axle hub and wheel hub. Since this spacing (wheel to wheel) is critical, any error requires an expensive dismounting of the gear side wheel and remounting. Accordingly, it is desirable to provide some means for better establishing the spacing of the gear hub and wheel hub.

SUMMARY OF THE INVENTION

Among the several advantages of the present invention may be noted the provision of a method and apparatus for preventing contact between a gear hub and a wheel hub of a wheel/axle set on a locomotive;and the provision of a method and apparatus for aiding in more exact positioning of a locomotive wheel with respect to a drive gear mounted adjacent the wheel.

The invention is illustrated in one form in conjunction with a wheel/axle set of a locomotive using a spacer formed of a semi-elastomeric material having a low coefficient of friction and specially adapted to fit into a stress relief groove of an axle between the drive gear hub and the wheel hub. The spacer is so designed as to be installable on the locomotive axle after installation of the drive gear and to be self-centering on the axle. Further, the spacer is so designed as to inhibit rotation of the spacer with respect to the axle such that the axle will not be marked circumferentially by spacer rotation.

In the illustrative form, the spacer is formed of NYLATRON® polymer material (NYLATRON is a trademark of The Polymer Corporation) with an annular, flat washer-like configuration having a plurality of radially inner, flexible members which can be compressed radially outward to allow the spacer to be pressed onto the axle with the members springing back to their original position when the spacer is aligned with the stress relief groove on the axle. The flexible members exert a spring pressure against the axle such that the spacer automatically centers about the axle. Further, the flexible members have sufficient elasticity to create a radially inward force against the axle sufficient to assure that the spacer is driven by and rotates with the axle.

In general, and in one form of the invention, a lateral stop is provided for limiting axial movement of a pair of members such as a driving gear and a driven wheel which are relatively axially movable on a rotatable shaft such as an axle. The lateral stop comprises a pair of annular opposed faces on the members which extend radially about the shaft and a resilient thrust accommodating means such as a spacer extending generally annularly about the shaft between the members. The thrust accommodating means includes a pair of radially extending opposite surface means respectively arranged at least in part in facing relation with the opposed faces on the members for abutting engagement therewith so as to resiliently accommodate relative axial movement of the members on the shaft. The thrust accommodating means has an annular outer surface interposed between the opposite surface means and radially spaced from the shaft and a generally annular inner surface interposed between the opposite surface means and arranged at least adjacent the shaft. A plurality of gripping fingers or tabs are disposed between the opposite surface means and integrally deformed from the inner surface generally radially inwardly thereof to grippingly engage the shaft so that the resilient thrust accommodating means is conjointly rotatable with the shaft.

Further, in general and in one form of the invention, a lateral stop is associated with a locomotive axle rotatably supporting a drive gear therefor and a driven wheel thereon in which the lateral stop comprises a pair of annular opposed faces on the driven wheel and the drive gear, an annular groove in the locomotive axle disposed generally between the opposed faces on the driven wheel and the drive gear, the groove including an annular base wall and a semi-elastomeric washer associated with the annular groove and extending generally annularly about the locomotive axle between the opposed faces. The elastomeric washer includes a pair of radially extending opposite surface means arranged at least in part in facing relation with the opposed faces for abutting engagement therewith, respectively, and an annular outer surface interposed between the opposite surface means and radially spaced from the locomotive axle. A generally annular inner surface is interposed between the opposite surface means and arranged at least adjacent the locomotive axle. A plurality of tab means are deformed from the inner surface to extend at least in part into the groove for engagement with the annular base wall of the groove.

Also in general, a method is provided in one form of the invention for assembling a semi-elastomeric washer or spacer with a locomotive axle, a drive gear and a driven wheel for the axle. The axle has an annular groove therein defining a base wall interposed between a pair of opposite sidewalls. The drive gear and driven wheel each have generally radially extending faces thereon. The washer has a generally annular inner surface with a plurality of resilient tabs or fingers integrally extending therefrom. In the practice of this method, the drive gear is associated in displacement preventing engagement about the axle, and the drive gear face is arranged adjacent one of the opposite sidewalls of the groove in the axle generally in radial alignment therewith when the drive gear is associated in operative position with the axle. The annular inner surface of the washer is positioned about the axle in engagement therewith, and the resilient tabs of the washer are compressed against the axle when the washer is positioned about the axle. The washer is axially slid along the axle toward the groove therein with the resilient tabs compressed in engagement with the axle, and the washer is axially aligned with the groove to displace the tabs from their respective compressive engagement with the axle as the washer is slid along the axle. The tabs are resiliently displaced into the groove into gripping engagement with the base wall of the groove, and one of the opposite surfaces on the washer is engaged with the drive gear face when the washer is radially aligned with the groove. The driven wheel is disposed in displacement preventing engagement about the axle, and the driven wheel face is placed adjacent the other of the opposite sidewalls of the groove and in engagement with the other of the opposite surfaces on the washer when the driven wheel is disposed about the axle.

BRIEF DESCRIPTION OF THE DRAWING

For a better understanding of the present invention, reference may be had to the following detailed description taken in conjunction with the accompanying drawings in which.

DETAILED DESCRIPTION OF THE INVENTION

Figure 1:
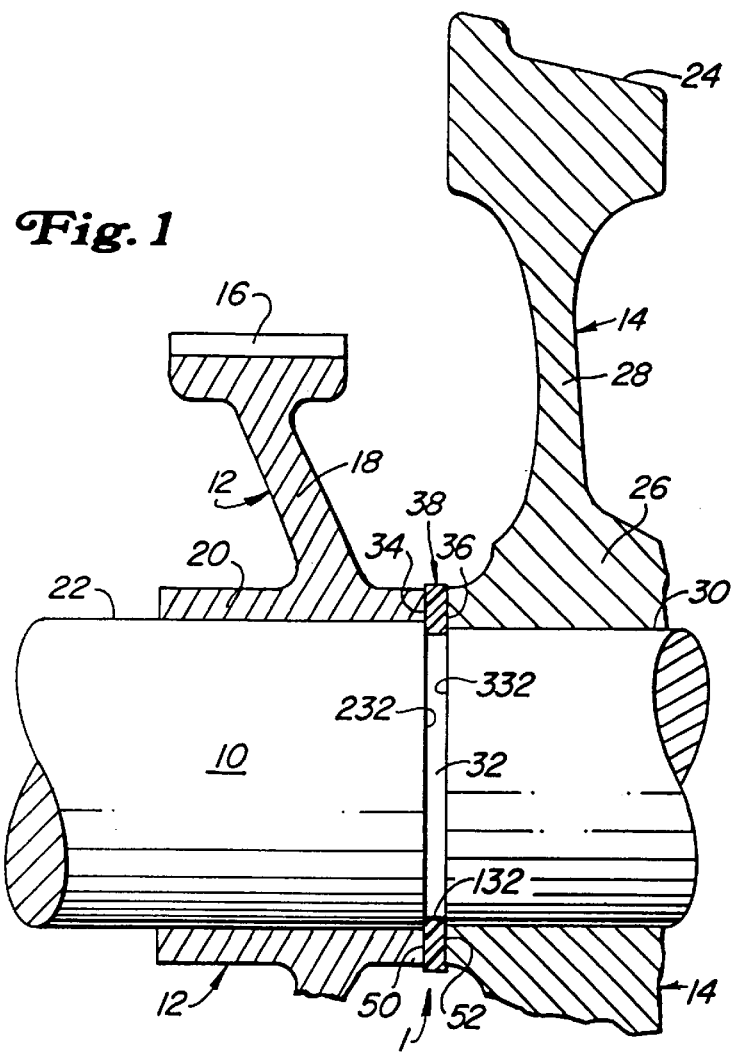
FIG. 1 is a simplified representation of a portion of a wheel axle set showing mounting of a drive gear and wheel on a locomotive axle and incorporating a lateral stop in accordance with the present invention.

Referring to the drawings in general, FIG. 1 illustrates a portion locomotive of a driven axle (shaft 10) on which a drive gear 12, shown in cross-section, and a driven wheel 14, also shown in cross-section, are mounted. The gear 12 includes radially outer gear teeth 16 adapted for engaging mating teeth of a gear (not shown) driven by an electric traction motor (not shown). The outer teeth 16 are coupled by an intermediate flange 18 to a gear hub 20. The diameter of the axle 10 at the area 22 where gear hub 20 seats is slightly larger than the diameter of the axle at an area 30 where the wheel seats. This difference in diameter allows the gear hub 20 to slip over the end of the axle and then be press fitted onto the area 22. The wheel 14 includes an outer rolling surface 24 coupled to a radially inner hub 26 by an intermediate flange 28. The wheel hub 26 has a slightly smaller diameter central opening as compared to the opening in the gear hub 20 thus allowing the wheel hub to be press fitted onto the outer end or reduced diameter portion 30 of the axle 10.

The reduced diameter portion 30 of the axle 10 extending from the area 22 to an outer end of the axle is a high stress area and considerable care must be exercised to assure that that portion of the axle is not marred by circumferentially extending surface markings such as might be caused by objects rotating around the axle.

Further, at the transition between the enlarged diameter area 22 and the reduced diameter portion 30 where the wheel 14 is mounted, there is provided a stress relief groove 32 which is carefully machined into the axle. The groove 32 is about 0.125 inch in width and about 0.125 inch in depth. The groove 32 establishes a nominal 0.125 inch space between the axially outward face 34 of gear hub 20 and the axially inward face 36 of wheel hub 26.

Loads transferred to the axle 10 through the wheel 14 or to the wheel 14 through the axle 10 from the locomotive can cause the axle to exhibit some degree of flexure between the torque applying gear 12 and wheel 14 causing some point on face 36 to move toward a point on face 34. Applicants' invention prevents contact between the gear hub face 34 and wheel hub face 36 by use of a novel lateral stop arrangement 1 including a resilient thrust accommodating means, such as a spacer or thrust washer 38, positioned between the face 34 and the face 36.

Figure 2:
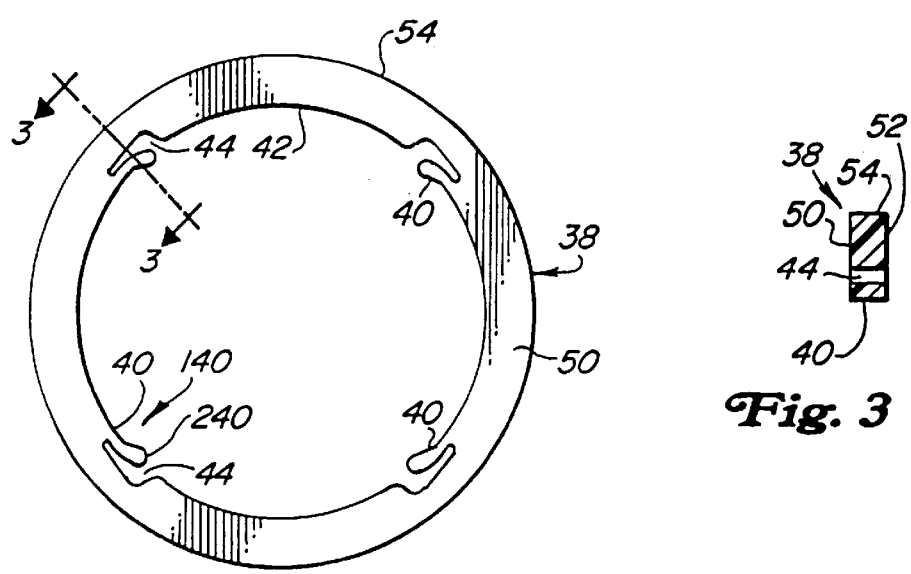
FIG. 2 is a face view of a spacer in accordance with a preferred form of the invention.
Figure 3:
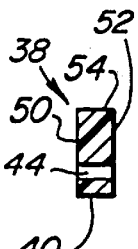
FIG. 3 is a cross-section of the spacer of FIG. 2 taken along the line 3—3.

However, one problem with the use of the spacer 38 is that the spacer must have an inner diameter large enough to slide over the axle end and yet not be free to rotate when positioned in alignment with the circumferential groove 32 which has a smaller diameter than the axle end area at 30. Applicants solved this problem by providing a spacer 38 as shown in FIGS. 2 and 3 which includes a plurality of uniformly spaced radially inward directed resilient fingers, tabs, or tab means 40. Each of the fingers 40 is integrally formed so as to extend generally radially inwardly from an annular inner surface 42 of spacer 38, and a plurality of recesses 44 are provided in the inner surface 42 of the spacer 38 for respectfully receiving the fingers. Thus, each of the fingers 40 can be pressed radially outward into the associated one of the recesses 44 to create a substantially smooth inner surface 42 that can be dimensioned to fit snugly about the reduced diameter portion 30 of axle 10 allowing the spacer to slide onto the axle until the spacer is aligned with the groove 32, at which point the fingers 40 will spring back, i.e., radially inward, and seat in engagement with a base wall 132 interposed between a pair of opposite sidewalls 232 and 332 defined by the groove.

The distribution of the fingers 40 and their relative elasticity will cause the spacer to self-center itself about the axle 10. Further, each finger 40 has a free end 140 provided with an arcuate portion 240 which engages base wall 132 of groove 32, generally in the same manner discussed above, and the spacer 38 is preferably formed of a semi-elastomeric material such as NYLATRON material and particularly a type GSM-P nylon material available from the Polymer Corporation.

The spacer 38 is provided with a pair of opposite surfaces 50,52 extending generally radially between inner surface 42 and a generally annular outer surface 54 on the spacer, and when the spacer is associated with groove 32 of axle 10, as discussed above, the opposite surfaces of the spacer are respectively engaged with drive gear face 34 and driven wheel face 36 arranged in opposed relation with each other. Therefore any relative movement between the hubs of drive gear 12 and driven wheel 14 involves contact through the spacer 38, and of course, in the event of the occurrence of such relative movement, the drive gear and driven wheel become relatively movable members. Since the NYLATRON material has a very low coefficient of friction, such contact has little tendency to induce motion in either the gear 12 or wheel 14.

A further advantage gained by use of the spacer 38 is in the assembly process in which the wheel 14 is press fitted onto axle 10. In prior practice, the position of wheel 14 was determined with respect to another wheel mounted on an opposite end of the axle using a measuring rod. This process often resulted in slight positioning errors. However, since the nominal spacing between the gear hub and wheel hub is only about 0.125 inches, even an error of a few thousandths of an inch could lead to axle failure from repeated contact between the gear hub and wheel hub. Now, however, the wheel 14 can be positioned relatively accurately with respect to the gear hub 20 by merely pressing the wheel 14 into firm contact with the spacer 38. In other words, the spacer 38 functions to enable precise positioning of the wheel 14 with respect to gear hub 20.

In general, a method is provided in one form of the invention for assembling a semi-elastomeric washer or spacer 38 with a locomotive axle 10, a drive gear 12 and a driven wheel 14 for the axle. The axle 10 has an annular groove 32 therein defining a base wall 132 interposed between a pair of opposite sidewalls 232, 332. The drive gear 12 and driven wheel 14 each have generally radially extending faces 34, 36, respectively. The washer 38 has a generally annular inner surface 42 with a plurality of resilient tabs or fingers 40 integrally extending therefrom. In the practice of this method, the drive gear 12 is associated in displacement preventing engagement about the axle 10, and the drive gear face 34 is arranged adjacent one of the opposite sidewalls 232 of the groove 32 in the axle generally in radial alignment therewith when the drive gear is associated in operative position with the axle. The annular inner surface 42 of the washer 38 is positioned about the axle 10 in engagement therewith, and the resilient tabs 40 of the washer are compressed against the axle when the washer is positioned about the axle. The washer 38 is axially slid along the axle 10 toward the groove 32 therein with the resilient tabs 40 compressed in engagement with the axle, and the washer is axially aligned with the groove to displace the tabs 40 from their respective compressive engagement with the axle as the washer is slid along the axle. The tabs 40 are resiliently displaced into the groove 32 into gripping engagement with the base wall 132 of the groove, and one of the opposite surfaces on the washer is engaged with the drive gear face 34 when the washer is radially aligned with the groove. The driven wheel 14 is disposed in displacement preventing engagement about the axle 10, and the driven wheel face 36 is placed adjacent the other of the opposite sidewalls 332 of the groove 32 and in engagement with the other of the opposite surfaces on the washer when the driven wheel is disposed about the axle.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A lateral stop for limiting axial movement of a pair of members relatively axially movable on a rotatable shaft, the lateral stop comprising:

a pair of annular opposed faces on the pair of members and extending radially about the shaft, respectively;

resilient thrust accommodating means extending generally annularly about the shaft between the pair of members including a pair of radially extending opposite surfaces respectively arranged at least in part in facing relation with said opposed faces on the pair of members for abutting engagement with said opposed faces on the pair of members so as to resiliently accommodate relative axial movement of the pair of members on the shaft, an annular outer surface interposed between said opposite surfaces and radially spaced from the shaft, a generally annular inner surface interposed between said opposite surfaces and arranged at least adjacent the shaft, and a plurality of gripping fingers disposed between said opposite surfaces and integrally deformed from said inner surface generally radially inwardly thereof to grippingly engage the shaft so that said resilient thrust accommodating means is conjointly rotatable with the shaft.

2. A lateral stop associated with a locomotive axle rotatably supporting a drive gear and a driven wheel, the lateral stop comprising:

a pair of annular opposed faces on the driven wheel and the drive gear;

an annular groove in the locomotive axle disposed generally between said opposed faces on the driven wheel and the drive gear, said groove including an annular base wall;

an elastomeric washer associated with said annular groove and extending generally annularly about the locomotive axle between said opposed faces, said elastomeric washer including a pair of radially extending opposite surfaces arranged at least in part in facing relation with said opposed faces for abutting engagement with said opposed faces, respectively, an annular outer surface interposed between said opposite surfaces and radially spaced from the locomotive axle, a generally annular inner surface interposed between said opposite surfaces and arranged at least adjacent the locomotive axle, and a plurality of tabs deformed from said inner surface to extend at least in part into said grooves for engagement with said annular base wall of said grooves, respectively.

3. The lateral stop as set forth in claim 2 wherein said washer further includes a plurality of recesses formed in said annular inner surface for receiving the tabs.

4. The lateral stop as set forth in claim 2 wherein each of said tabs includes a free end having an arcuate portion engaged with said annular base wall.

5. A method of assembling a semi-elastomeric washer with a locomotive axle and a drive gear and driven wheel for the axle, the axle having an annular groove therein defining a base wall interposed between a pair of opposite sidewalls, the drive gear and driven wheel each having a generally radially extending face thereon, and the washer having a generally annular inner surface with a plurality of resilient tabs integrally deformed therefrom, the method comprising:

arranging the drive gear face adjacent one of the opposite sidewalls of the groove in the axle generally in radial alignment with the one of the opposite sidewalls of the groove;

positioning the annular inner surface of the washer about the axle in engagement with the axle and compressing the resilient tabs of the washer against the axle;

sliding the washer axially along the axle toward the groove therein with the resilient tabs compressed in engagement with the axle and radially aligning the washer with the grooves to displace the tabs from their respective compressive engagement with the axle;

resiliently displacing the tabs into the groove into gripping engagement with the base wall of the groove and engaging one of the opposite surfaces on the washer with the drive gear face; and placing the driven wheel face adjacent an other one of the opposite sidewalls of the groove and in engagement with an other one of the opposite surfaces on the washer.

* * * * *